(12) United States Patent
Stich et al.

(10) Patent No.: US 8,491,063 B2
(45) Date of Patent: Jul. 23, 2013

(54) WHEEL RIM FOR A MOTOR VEHICLE

(75) Inventors: Günter Stich, Bochum (DE); Horst Walter Tamler, Witten (DE); Jens-Ulrik Becker, Duisburg (DE); Thomas Heller, Duisburg (DE); Roland Wunderlich, Bergkamen (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 182 days.

(21) Appl. No.: 13/119,997

(22) PCT Filed: Sep. 21, 2009

(86) PCT No.: PCT/EP2009/062181
§ 371 (c)(1),
(2), (4) Date: Jun. 2, 2011

(87) PCT Pub. No.: WO2010/031863
PCT Pub. Date: Mar. 25, 2010

(65) Prior Publication Data
US 2011/0227400 A1  Sep. 22, 2011

(30) Foreign Application Priority Data
Sep. 22, 2008 (DE) .................. 10 2008 048 389

(51) Int. Cl.
*B60B 3/10* (2006.01)
(52) U.S. Cl.
USPC ................... 301/64.306; 301/63.103
(58) Field of Classification Search
USPC ............. 301/63.101, 63.103, 63.106, 64.301, 301/64.306, 64.702; 29/894.32
See application file for complete search history.

(56) References Cited

U.S. PATENT DOCUMENTS

| 2,125,544 | A | * | 8/1938 | Colbeth ........................ 554/77 |
| 2,439,881 | A | | 4/1948 | Ash |
| 3,790,219 | A | | 2/1974 | Watts |
| 3,993,356 | A | | 11/1976 | Groff et al. |
| 4,518,204 | A | * | 5/1985 | Takada ..................... 301/63.103 |
| 5,031,966 | A | * | 7/1991 | Oakey ........................ 301/37.11 |
| 6,743,307 | B1 | | 6/2004 | Engl et al. |
| 6,817,679 | B1 | * | 11/2004 | Prieto et al. .............. 301/95.101 |
| 7,377,596 | B2 | * | 5/2008 | Steinke et al. ........... 301/64.703 |
| 2010/0314932 | A1 | * | 12/2010 | Fukaya et al. ........... 301/63.101 |

FOREIGN PATENT DOCUMENTS

| DE | 19936151 A1 | 2/2001 |
| DE | 102005006606 B3 | 3/2006 |
| FR | 2125544 A1 | 9/1972 |
| JP | 2001219701 A | 8/2001 |
| WO | 9833666 A1 | 8/1998 |

* cited by examiner

Primary Examiner — Jason Bellinger
Assistant Examiner — Jean Charleston
(74) Attorney, Agent, or Firm — The Webb Law Firm

(57) ABSTRACT

The invention relates to a wheel rim for a motor vehicle which can be economically manufactured, with a wheel disc made of steel sheet and a rim flap running around the circumference of the wheel disc. Due to the fact that the steel sheet of the wheel disc is formed from at least three superimposed steel layers, joined to one another by roll-bonding in a non-detachable manner, of which the inner core layer has a lower strength than the outer layers, it is thereby guaranteed that the wheel rim according to the invention, with a low weight, can safely accommodate the forces arising in practical operation.

16 Claims, 1 Drawing Sheet

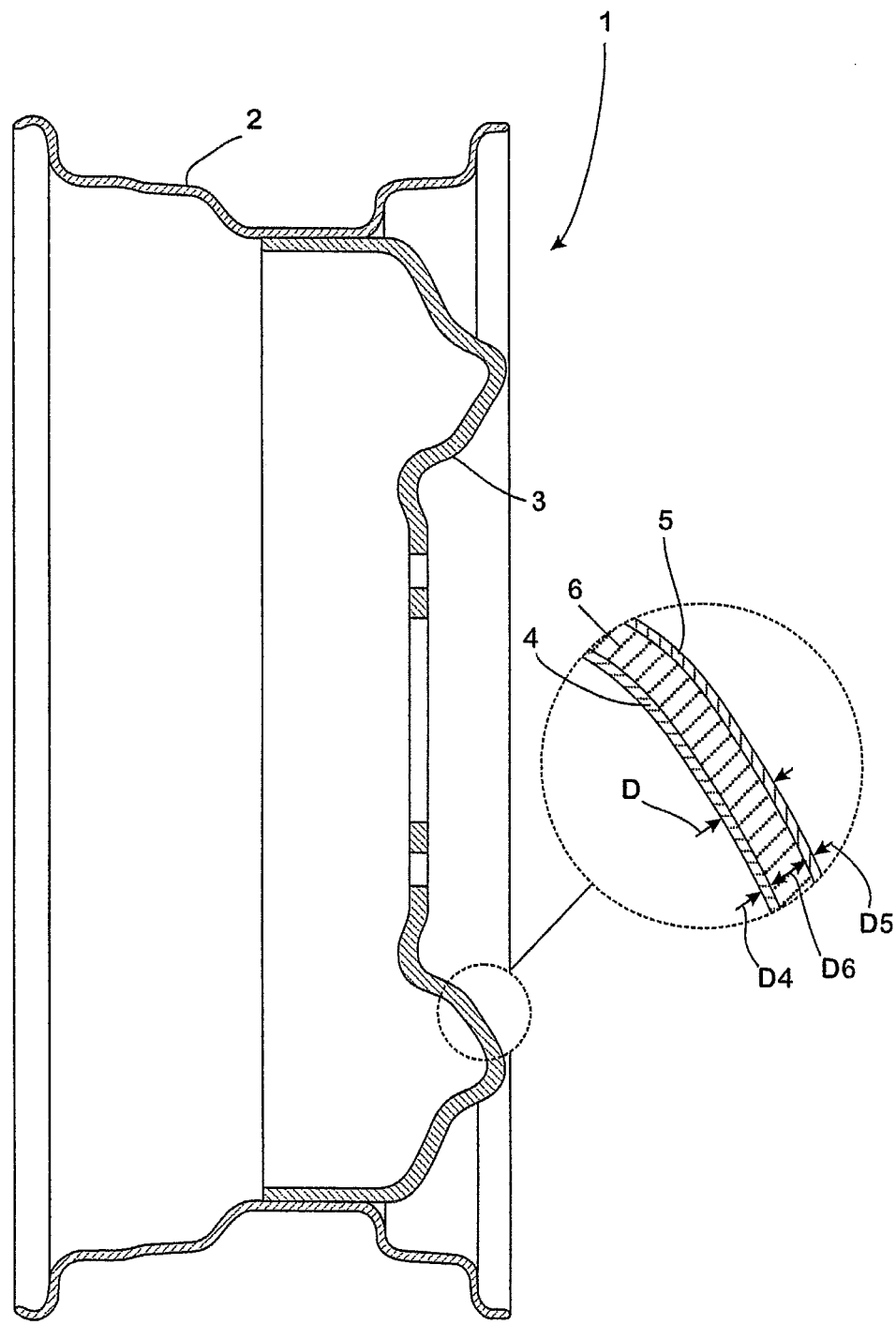

WHEEL RIM FOR A MOTOR VEHICLE

BACKGROUND OF THE INVENTION

1. Field of the Invention

The invention relates to a wheel rim, made of a steel material, for a motor vehicle such as a motor car or lighter and heavy commercial vehicles.

2. Description of Related Art

Wheel rims of this type are usually manufactured from hot-rolled steel or cast or forged from light metal. Steel rims are characterised, in this context, by a favourable manufacturing price and good performance properties. All the same, wheel rims made of light metal were earlier regarded as particularly favourable because of their lower weight with respect to minimising the unsprung weight of the vehicle. It is possible nowadays, however, for wheel rims to be manufactured at a perceptibly more favourable manufacturing price from high strength and yet easily deformable steel sheets, which, because of their lower wall thickness, have an even lighter weight than light metal wheel rims.

According to general linguistic usage, steel rims are usually composed of what is referred to as the "rim" and a "wheel disc". When in use, the tyre of the wheel, which is formed from the tyre and the wheel rim, sits on the rim, while the wheel disc establishes the connection between the wheel and the respective axle of the vehicle.

The wheel discs and the rims of steel rims are today usually manufactured from hot-rolled high-strength steels, the tensile strength of which lies in the range of 600 MPa. One typical representative of the steels which come into consideration for this purpose is available on the market under the designation "DP-W600". This contains, as standard, in addition to iron and unavoidable impurities, (in % by weight) up to 0.12% C, up to 0.08% Al, up to 1.5% Mn, up to 0.8% Si, in total up to 1.00% Cr and Mo, up to 0.06% P, up to 0.005% B, up to 0.01% S and in total up to 0.15% Nb and Ti. A dual-phase steel composed in this manner, of high strength and at the same time easily deformable, is also described in DE 199 36 151 A1.

In order to improve the possibilities for the visual presentation of steel rims, and at the same time improve their protection against corrosion, it has been proposed in JP 2001-219701 that the wheel discs of such a steel rim be manufactured from a multi-layer flat material assembled in the form of a sandwich. The first layer of this material consists of a steel sheet, provided with a metallic coating to provide protection against corrosion, and in practical use absorbs the loads imposed on the steel rim. Applied onto the steel sheet layer is a second layer, on which in turn a third layer lies. The second layer can consist of a resin or the like, and, in the sense of a filler material, has the task of preventing the penetration of moisture into the space which may be present between the first and third layer. In this way, the first steel sheet layer is to be provided with additional protection against corrosion. The third layer of the material of the wheel disc is applied, with the known steel rim, on the side which is visible to the observer when fitted to a vehicle. It can be manufactured, for example, from aluminium, stainless steel or another material regarded by the observer as being of particularly high quality. Its function consists essentially of providing the observer with a particularly good visual impression of the steel rim.

Despite the successes achieved in the past with weight reduction, users still wish to reduce the weight of motor vehicle rims still further. This not only contributes to an improvement in the handling characteristics as a result of minimised unsprung weights but also reduces the overall weight of the respective vehicle.

Against this background, the object of the invention was to provide a wheel rim which can be economically manufactured and which, with low weight, can reliably accommodate the forces imposed on such a wheel rim during practical operation.

SUMMARY OF THE INVENTION

A wheel rim according to the invention has, like the prior art, a wheel disc manufactured of steel sheet and a rim running around the circumference of the wheel disc.

According to the invention, in this situation the steel sheet of the wheel disc is formed from at least three superimposed steel layers, joined to one another in a non-detachable manner by roll-bonding, of which the inner core layer has a lower strength than the outer layers. At the same time, the invention is not restricted to only manufacturing the wheel discs of a steel rim from the at least three-layer flat steel material used according to the invention. Rather, the rim can also consist of such a material.

The invention is based on the understanding that the maximum stresses, which occur in practical operation and which are essential to the design of a wheel disc of a wheel rim, arise in a layer close to the surface of the sheet metal from which the wheel disc is formed. By now proposing, according to the invention, that a steel sheet composed of at least three layers is used for the manufacture, in each case an outer layer consisting of a particularly high-strength steel can be allocated to the layers of the wheel rim wheel disc which in practice are subjected to the highest loading. The core layer, over which the outer layers of the wheel disc are joined to one another, by contrast consists, according to the invention, of a steel of lesser strength. On the other hand, however, this has a better deformability than the stronger outer layers.

As a result of this multi-layered structure of the steel flat product processed in accordance with the invention, it is possible for a steel sheet blank, cut out of such flat material, despite the high strength of the outer layers, to be formed flawlessly into the wheel disc and, where appropriate, also the rim.

At the same time, due to matching the strength characteristics of the individual layers of the steel sheet material processed according to the invention to the loads arising in practice, the thickness, and therefore inherently the weight of the wheel disc, can be perceptibly reduced. Calculations and practical experiments have thus shown that the weight of a steel rim, in which at least the wheel disc consists, according to the invention, of a steel composite material of three or more layers, with the same loading capacity can be consistently 10-20% lighter than a wheel rim formed from conventional single-layer steel sheet.

The steel sheet, consisting of at least three layers and preferably processed as hot strip, from which, according to the invention, the wheel disc and, where appropriate, also the rim are manufactured, can be manufactured by hot-roll bonding in such away that the layers of the steel sheet are permanently joined to one another in a non-detachable manner.

A method which makes this possible is described, for example, in the German patent specification DE 10 2005 006 606 B3. According to this method, at least two essentially parallelepiped-shaped sheets are produced, each from a different steel material. The surfaces of the sheets, facing each other and laid on one another, are then subjected to a material removing surface treatment. The purpose of this treatment is to adapt the surface shape of the one sheet to the surface shape of the other sheet in such a way that the two surfaces are essentially in close contact with one another when the sheets are lying on one another. To achieve this, the surfaces concerned are freed of undesirable foreign particles, such as scale and the surfaces are activated by chemical-physical means. The sheets are then laid with their surface-treated surfaces on one another, and the sheets lying on one another are welded to one another to form a sheet package. This sheet package is then heated to an initial hot-rolling temperature and hot-rolled to a coilable roll-bonded strip. The hot strip roll-bonded in this way is then wound to form a coil. In this way, roll-bonded hot strips can be economically produced with perceptibly reduced time and effort in terms of process technology.

A thickness ratio, which is optimum, on the one hand, with regard to loading capacity and, on the other hand, with regard to the deformability of the at least three-layer steel sheet, between the outer layers and the core layer results when the thickness of the outer layers in each case takes up 5-40%, in particular 5-30%, of the total thickness of the steel sheet of the wheel disc. In this situation, the outer layers do not necessarily have to be of the same thickness. Rather, the actual thickness of the outer layers is selected as a function of the strength of the steel material used in each case for the outer layers, its deformability produced in combination with the steel material of the core layer and the loading states which are to be anticipated in practice.

One possibility for manufacturing a wheel rim in the manner according to the invention with a particularly good visual appearance with simultaneously optimized corrosion resistance consists in at least one of the outer layers of the steel sheet of the wheel disc consisting of a rust-resistant steel. In this situation, the outer layer concerned is, preferably, that which is arranged on the outside after the wheel rim has been fitted to a vehicle and which is seen by an observer. The outer layer which is then arranged on the side facing the vehicle can, by contrast, consist, for example, of a particularly tough steel material protected by an appropriate corrosion protection coating.

If sheet metal materials are available for the individual outer layers of the three-layer steel flat product, used according to the invention for the manufacture of the wheel disc, which provide an adequate surface condition for the particular application purpose, as well as corrosion resistance, then, from the manufacturing point of view and from the point of view of costs, it may, however, be expedient if the outer layers consist of the same steel material.

Suitable for the outer layers of the steel composite material, processed according to the invention preferably as hot strip and cold formed into the wheel disc, are, for example, inherently-known martensitic steels, dual-phase steels, complex-phased steels or rust-proof ferrite austenitic steels.

In order for the outer layers consisting of one of these steels to be reliably capable of accommodating the loads imposed on the wheel disc in practical operation, but at the same time being able to be sufficiently well deformed, the steels of the outer layer should have a yield strength from 600 MPa to 1150 MPa.

Typically, such steels intended for the outer layers of the multi-layer steel sheet processed in accordance with the invention contain, in addition to iron and unavoidable impurities, (in % by weight) up to 0.24% C, up to 3.0% Mn, in particular up to 2.5% Mn, up to 1.5% Si, up to 0.05% P, up to 0.02% S, up to 25% Cr, in particular up to 24.5% Cr, up to 1.0% Mo, in particular up to 0.6% Mo, in total up to 0.2% Nb and Ti, up to 0.25% N, up to 2.5% Al, in particular up to 1.7% Al, up to 0.25% V, up to 0.01% B, up to 8.0% Ni, in particular up to 6.0% Ni, and up to 4.0% Cu, in particular up to 0.8% Cu.

Preferably here, the C content of the steel of the outer layer is restricted to a maximum of 0.2% by weight, in order to ensure the required cold forming ability and the welding properties, required for connecting the wheel disc and rim, using the conventionally applied welding methods.

It can also be advantageous if the Mn content of the steel of the outer layer amounts to a maximum of 2.5% by weight, in particular up to 2.2% by weight, in order to avoid excessively strong microsegregation, which would lead to the formation of hard transformation products and therefore to the deterioration of the cold forming ability.

Inasmuch as a maximum of 1.0% by weight Si is present in the steel used according to the invention for at least one of the outer layers, an optimally smooth surface quality of the obtained steel sheet can be attained.

It can also be favourable if the Al content of the steel of the outer layer is restricted to a maximum of 2.0% by weight, in particular to 1.2% by weight, since in this way the oxidation products, which occur with the manufacture of a coated hot strip, will be controlled in such a way that, after pickling, a good surface formation can be achieved.

A rust-resistant steel, which lies within the general alloying specifications referred to above and which fulfils particularly well the demands imposed on the outer layers of a steel sheet with three or more layers processed in accordance with the invention, contains (in % by weight) up to 0.05% C, 20-25% Cr, in particular 21.5-24.5% Cr, 3.0-8.0% Ni, in particular 3.0-5.5% Ni, 0.05-1.0% Mo, in particular 0.05-0.6% Mo, 0.005-0.25% N, in particular 0.05-0.2% N, and, optionally, one or more elements from the "Mn, Si" group, with the proportions Mn: 0.1-2.0%, Al: up to 0.1%, Si: up to 1.0%, and as the remainder iron and unavoidable impurities.

Investigations have revealed that the steel used for the core layer of the at least three-layer steel sheet processed according to the invention has an optimum combination of load-carrying capacity and deformability if the core layer has a yield strength of 200-500 MPa, in particular 300-500 MPa. Such a property profile can be provided, for example, by a dual-phase steel.

A steel which is particularly well-suited for the core layer contains, in addition to iron and unavoidable impurities, (in % by weight) up to 0.25% C, up to 2.0% Al, in particular up to 1.8% Al, up to 2.5% Mn, up to 1.0% Si, in total up to 1.0% Cr and Mo, up to 0.08% P, up to 0.02% S, up to 0.01% B, up to 0.2% V and, in total, up to 0.25% Nb and Ti. A combination of properties of the core layer, which is particularly well-suited for the purpose according to the invention, results if the core layer contains, in addition to iron and unavoidable impurities, (in % by weight), 0.07-0.17% C, 0.95-2.2% Mn, 0.05-0.8% Si, 0.03-0.09% P, up to 0.015% S, in total 0.4-1.0% Mo+Cr, in total up to 0.015% Nb+Ti, 0.02-2.0% Al, and up to 0.005% B.

In the event of at least one of the outer layers consisting of a rust-resistant steel with a Cr content of at least 20% by weight, it is advantageous if the C content of the core layer amounts to a maximum of 0.1% by weight. In this way, the formation of chromium carbides at the boundary layers between the core layer and the respective outer layer can be avoided, which otherwise could form in the course of a heat treatment or during the hot-rolling and impair the adherence of the outer layer to the core layer.

BRIEF DESCRIPTION OF THE DRAWING

The single FIGURE shows in diagrammatic form a wheel rim 1 in a cross-section.

DETAILED DESCRIPTION OF THE INVENTION

The wheel rim 1 is composed in an inherently-known manner from a separately prefabricated ring-shaped rim 2 and a pot-shaped wheel disc 3 which sits in the aperture of the rim, and is in contact with its circumferential surface with the inner surface of the rim. The fixed connection between the rim 2 and the wheel disc 3 is produced by means of weld seams applied section by section and distributed at regular intervals over the inner circumference of the rim 2.

The rim 2 is cold-formed from a sheet cut. The sheet cut is separated, for example, from a hot-rolled steel strip which has a yield strength of approx. 330 MPa and a tensile strength of 660 MPa. In addition to iron and unavoidable impurities, it contains (in % by weight) up to 0.07-0.09% C, 0.02-0.04% Al, 0.95-1.05% Mn, 0.05-0.08% Si, in total 0.4-0.55% Mo and Cr, 0.03-0.045% P, up to 0.0005% B, up to 0.003% S, up to 0.01% V and in total up to 0.04% Ti and Nb. In addition to this, the rim can also consist of the grades known under the designation DD11-14, of S300MC-S460MC, of S225-S355, of HDT450X-HDT700X or of standard grades of corresponding foreign standards.

The wheel disc 3, by contrast, is cold-formed from a steel sheet blank, which is separated from a steel sheet manufactured as a three-layer hot strip. The hot strip concerned is in this situation produced, for example, in the manner described in DE 10 2005 006 606 B1.

In a first embodiment, the outer layers 4, 5, of the three-layer steel sheet blank, from which the wheel disc 3 of the wheel rim was formed, consisted of a commercially available martensitic steel with a tensile strength Rm of 1200 MPa and a yield strength of 900 MPa, which contained (in % by weight) 0.11-0.125 C, 1.35-1.5% Mn, 0.05-0.1% Si, up to 0.015% P, in total up to 0.35% Cr+Mo, up to 0.003% S, in total up to 0.035-0.055% Ti and Nb, 0.015-0.035% Al, up to 0.05% V and 0.001-0.002% B.

The core layer 6 of the steel sheet blank from which wheel disc 3 was manufactured consisted, by contrast, of the same steel as the rim 2.

With this embodiment, the outer layers 4, 5, were of equal thickness. The ratio of their thickness D4, D5 to the overall thickness D of the steel sheet was in each case 10%, so that the remaining thickness D6 of the core layer 6 in this exemplary embodiment amounted to 80% of the total thickness.

Due to the fact that, with the exemplary embodiment described above, the outer layers 4, 5, of the wheel disc 3 are formed from a high-strength steel, while the core layer consists of a steel which has an optimum combination of good deformability and strength, the wheel disc 3 could be cold-formed with no problem despite comparably complex shaping and high deep-drawing ratios. With the same loading capacities, the overall thickness D of the three-layer steel sheet of the wheel disc 3 was 27% less than the thickness of a wheel disc, not shown here, which, with the same shaping, was manufactured from a conventional single-layer steel sheet of the composition specified above for the rim 2. The weight of the wheel disc 3, produced according to the invention from the three-layer steel sheet, was in this situation about one kilogramme below the weight of the conventionally manufactured wheel disc.

With a second exemplary embodiment, the outer layers 4, 5, of the three-layer hot-rolled steel sheet, from which the wheel disc 3 was cold-formed, consisted of a special steel standardized under the material number 1.4362 (C: 0.02% by weight, Cr: 22% by weight, Ni: 3.7% by weight, Mo: 0.15% by weight, N: 0.15% by weight, the remainder being iron and unavoidable impurities), while the core layer 6 of the steel sheet concerned consisted of an easily deformable steel with a lower strength in comparison with the steel 1.4362. The C content of the core layer 6 in this situation was restricted to less than 0.1% by weight, in order to prevent the formation of CrC at the boundary layers between the outer layers 4, 5 and the core layer 6 during heating of the sheet package, formed from the outer layers 4, 5 and the core layer 6 before the hot rolling, and during the subsequent hot rolling.

REFERENCE SYMBOLS

1 Wheel rim
2 Rim
3 Wheel disc
4 First outer layer of the wheel disc
5 Second outer layer of the wheel disc
6 Core layer of the wheel disc
D Total thickness of the three-layer steel sheet from which the wheel disc 3 is manufactured
D4 Thickness of the outer layer 4
D5 Thickness of the outer layer 5
D6 Thickness of the core layer 6

The invention claimed is:

1. A wheel rim for a motor vehicle, comprising a wheel disc made of steel sheet and a rim running around the circumference of the wheel disc, wherein the steel sheet of the wheel disc is formed from at least three superimposed steel layers, joined to one another by roll-bonding in a non-detachable manner, of which the inner core layer has a lower strength than the outer layers.

2. The wheel rim according to claim 1, wherein the rim is made of steel sheet and also comprises at least three superimposed steel layers joined to one another by roll-bonding in a non-detachable manner, of which the inner core layer has a lower strength than the outer layers.

3. The wheel rim according to claim 1, wherein the thickness of the outer layer in each case accounts for 5-40% of the total thickness of the steel sheet of the wheel disc.

4. The wheel rim according to claim 1, wherein at least one of the outer layers of the steel sheet of the wheel disc consists of a rust-resistant steel.

5. The wheel rim according to claim 1, wherein the outer layers consist of the same steel material.

6. The wheel rim according to claim 1, wherein at least one of the outer layers is manufactured from a steel which comprises, in addition to iron and unavoidable impurities, (in % by weight):
C: up to 0.24%,
Mn: up to 3.0%,
Si: up to 1.5%,
P: up to 0.05%,
S: up to 0.02%,
Cr: up to 25%,
Mo: up to 1.0%,
Nb, Ti: in total up to 0.2%,
N: up to 0.25%,
Al: up to 2.5%,
V: up to 0.25%,
B: up to 0.01%,
Ni: up to 8.0%, and
Cu: up to 4.0%.

7. The wheel rim according to claim 6, wherein the C content of the steel of the at least one outer layer amounts to a maximum of 0.2% by weight.

8. The wheel rim according to claim 6, wherein the Mn content of the steel of the at least one outer layer amounts to a maximum of 2.5% by weight.

9. The wheel rim according to claim 6, wherein the Si content of the steel of the at least one outer layer amounts to a maximum of 1.0% by weight.

10. The wheel rim according to claim 6, wherein the Al content of the steel of the at least one outer layer amounts to a maximum of 2.0% by weight.

11. The wheel rim according to claim 6, wherein the steel of the at least one outer layer comprises, in addition to iron and unavoidable impurities, (in % by weight):
C: up to 0.05%,
Cr: 20-25%,
Ni: 3.0-8.0%,
Mo: 0.05-1.0%,
N: 0.005-0.25%,
as well as, optionally, one or more elements selected from the group consisting of Mn, Al, Si, with the proportions:
Mn: 0.1-2.0%,
Al: up to 0.1%, and
Si: up to 1.0%.

12. The wheel rim according to claim 1, wherein the core layer is manufactured from a steel which, in addition to iron and unavoidable impurities, comprises (in % by weight):
C: up to 0.25%,
Al: up to 2.0%,
Mn: up to 2.5%,
Si: up to 1.0%,
Cr, Mo: in total up to 1.0%,
P: up to 0.08%,
S: up to 0.02%,
B: up to 0.01%,
V: up to 0.2%, and
Nb, Ti: in total up to 0.25%.

13. The wheel rim according to claim 1, wherein the steel sheet of the wheel disc is a hot-strip steel sheet.

14. The wheel rim according to claim 1, wherein the core layer is formed from a hot-rolled dual-phase steel sheet, which has a yield strength of 200-550 MPa.

15. The wheel rim according to claim 1, wherein at least one of the outer layers comprises a martensitic steel, a complex phase steel or a rust-proof ferrite austenitic steel, of which the yield strength is 600-1150 MPa.

16. The wheel rim according to claim 1, wherein at least one of the outer layers comprises a rust-resistant steel with a Cr content of at least 20% by weight, and the C content of the core layer amounts to a maximum of 0.1% by weight.

* * * * *

UNITED STATES PATENT AND TRADEMARK OFFICE
CERTIFICATE OF CORRECTION

PATENT NO.        : 8,491,063 B2                                                      Page 1 of 1
APPLICATION NO.   : 13/119997
DATED             : July 23, 2013
INVENTOR(S)       : Stich et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 254 days.

Signed and Sealed this
Eighth Day of September, 2015

Michelle K. Lee
*Director of the United States Patent and Trademark Office*